Feb. 16, 1971    R. G. CHUY ET AL    3,562,923
EDUCATIONAL AID VIEWING APPARATUS
Filed Aug. 26, 1968    4 Sheets-Sheet 1

INVENTORS.
Ruth S. Chuy
Daniel G. Chuy
BY Donnelly, Mentag & Harrington
ATTORNEYS

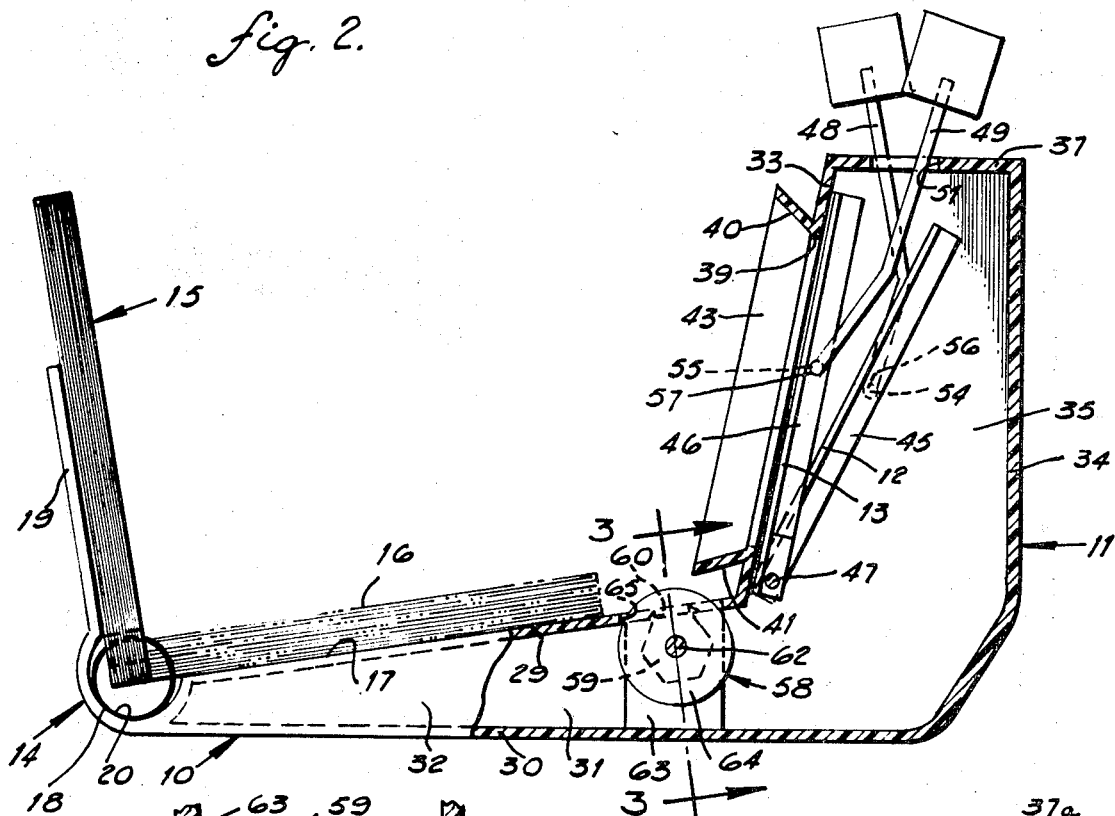
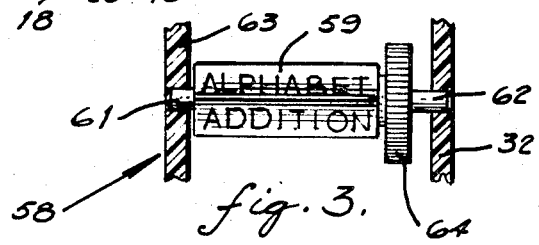
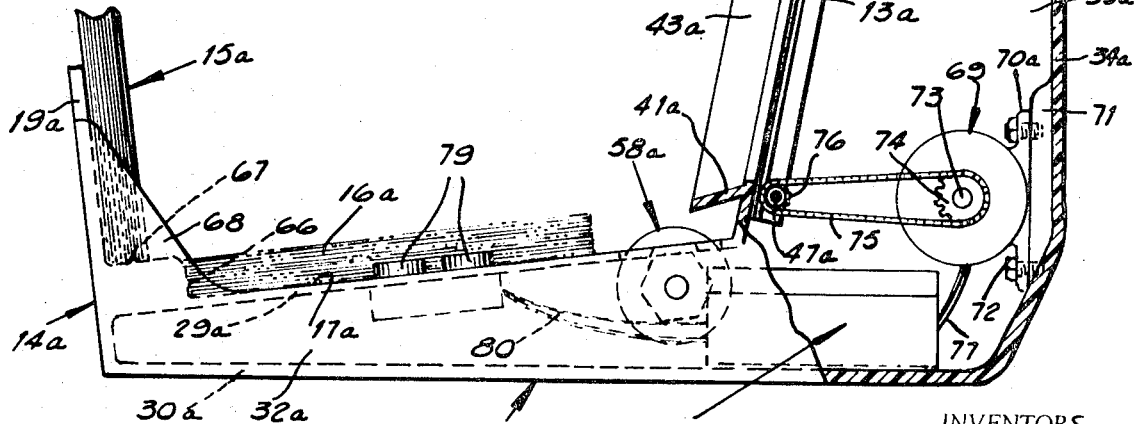

INVENTORS.
BY Ruth G. Chuy
Daniel J. Chuy
Donnelly, Mentag & Harrington
ATTORNEYS

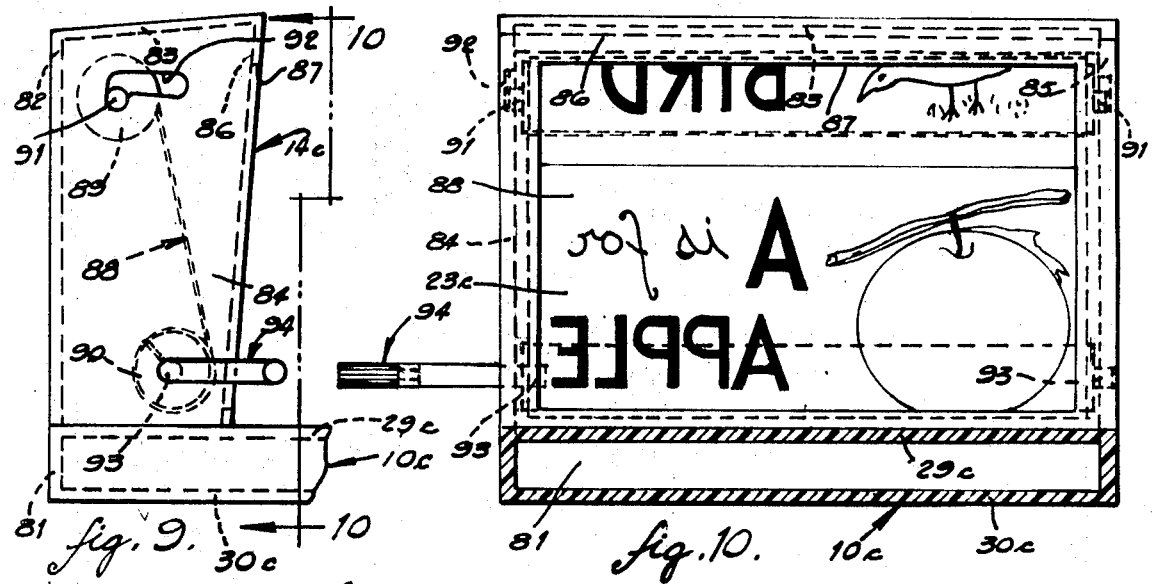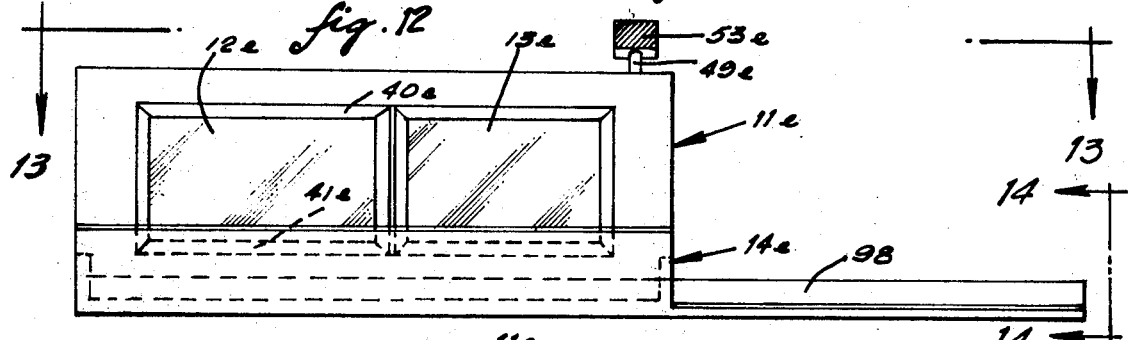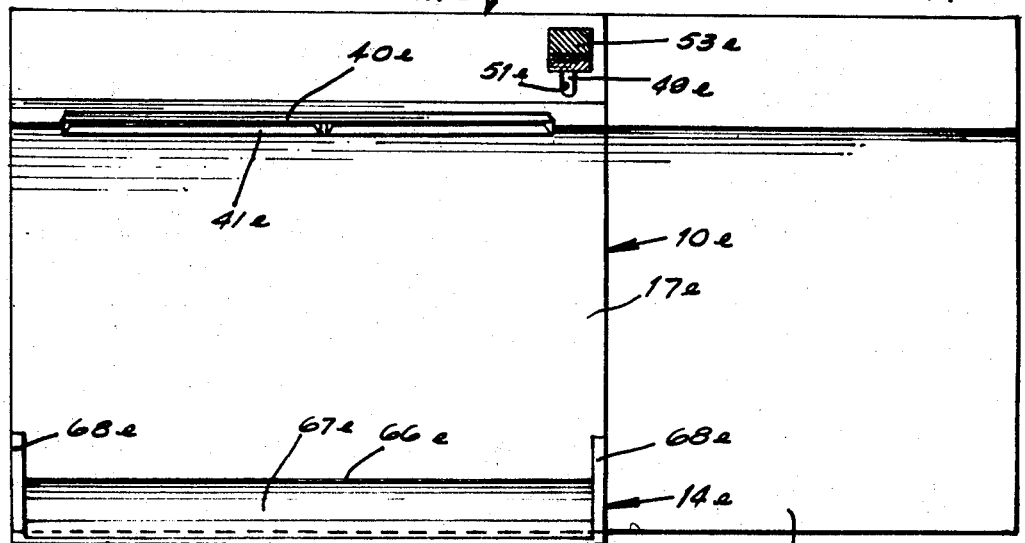

United States Patent Office 3,562,923
Patented Feb. 16, 1971

1

3,562,923
EDUCATIONAL AID VIEWING APPARATUS
Ruth G. Chuy and Daniel T. Chuy, both of 15447
Sorrento, Detroit, Mich. 48227
Filed Aug. 26, 1968, Ser. No. 755,062
Int. Cl. G09b 3/00
U.S. Cl. 35—9                                             16 Claims

ABSTRACT OF THE DISCLOSURE

An educational aid viewing apparatus for viewing flash cards provided with educational aid information or rolls of tape provided with educational aid information. The flash cards and rolls of tape have problems, questions, words and the like on the rear faces thereof, and solutions, answers, and pictures corresponding to said problems, questions, and words on the rear faces thereof in a position adjacent to the problems, questions, words and the like. The flash cards and the rolls of tapes are mounted at one end of a platform in a position spaced apart from a pair of inclined mirrors. The mirrors may each be pivotally mounted, or one mirror may be fixed and the other mirror pivotally mounted. The flash cards and the rolls of tapes are each movable from an inoperative position to an operative inclined position in front of the pair of inclined mirrors so that the problems, questions, or words are viewable in the mirrors when the mirrors are in a first position and not viewable in the mirors when one or more of the mirrors is pivoted to an inoperative position.

SUMMARY OF THE INVENTION

This invention relates generally to an educational aid viewing apparatus for teaching mathematics, names of flowers, names of animals, names of persons, and so forth, and more particularly to an educational aid viewing apparatus which employs a pair of inclined mirrors and either a set of inclined flash cards or an inclined roll of tape, and wherein the mirrors and the flash cards or tape are disposed at diverging angles relative to each other when the cards and tape are in an operative position.

It is an important object of the present invention to provide an educational aid viewing apparatus which is provided with means for mounting either a set of flash cards or a roll of tape in an inclined position in front of a pair of inclined mirrors so that a viewer may view educational aid subject matter on the rear faces of said cards or the rear side of said tape. The pair of mirrors are inclined at an acute angle relative to the rear faces of said flash cards or the rear face of said roll of tape, and at least one of the mirrors may be tilted or pivoted backwardly to an inoperative position so that the rear faces of the flash cards or the rear face of said roll of tape is unobservable.

It is another object of the present invention to provide an educational aid viewing apparatus which employs a novel means for mounting a set of flash cards or a roll of tape on a stand in a position in front of a pair of inclined mirrors for viewing the rear faces of said cards or the rear face of said tape when the cards or tape are moved to a vertically inclined position so that a problem or other educational aid subject matter appears on the rear faces of the flash cards or tape and the answers to said problems are quickly and easily observable in said pair of mirrors.

It is still another object of the present invention to provide an educational aid viewing apparatus which includes a platform, a housing on the rear end of said platform, a pair of mirrors mounted on said housing in an operative inclined position so that the mirrors slope upwardly and rearwardly relative to the front end of the platform, a carrier means provided on the rear face thereof with educational aid subject matter, mounting means on the front

2 end of the platform for holding said carrier means in a position unobservable in said mirrors and for holding said carrier means in an inclined observable position spaced forwardly from said mirrors, so that when the carrier means is in said inclined observable position the rear face of said carrier means is viewable in said mirrors, at least one of said mirrors being pivotally mounted between an inclined operative position and a retracted inoperative position, and said mounting means for holding the educational aid subject matter means in an inclined observable position is adapted to hold said carrier means at a forwardly and upwardly inclined angle so that the rear face thereof is viewable in said mirrors and is disposed at an acute angle relative to said mirrors. Said carrier means may comprise a set of flash cards which are provided on the rear faces thereof with educational aid subject matter such as the names of a flower, an animal, person, question, problem, or the like, and the corresponding picture, solution, answer, or the like, whereby the question and answer are each simultaneously reflected in one of said pair of mirrors and at least one of said mirrors can be pivoted to an inoperative position to make either a question or answer unobservable, as desired. The educational aid viewing apparatus may be provided with an indicator means for indicating the type of educational aid subject matter carried on the carrier means. Said carrier means may also comprise a roll of tape which is adapted to be moved by a manually operated means or a power means from a first roll to a second roll, and wherein the educational aid subject matter is on the rear side of the tape which faces the pair of mirrors.

The educational aid viewing apparatus may be provided with a writing board on one side of said platform.

Other objects, features and advantages of this invention will be apparent from the following detailed description, appended claims, and the accompanying drawings.

In the drawings:

FIG. 1 is a front perspective view of an educational aid viewing apparatus for viewing flash cards and the like;

FIG. 2 is a vertical view of the structure illustrated in FIG. 1, taken along the line 2—2 thereof, and showing a partial side elevational view and a partial vertical section;

FIG. 3 is a fragmentary, elevational section view of the structure illustrated in FIG. 2, taken along the line 3—3 thereof, and looking in the direction of the arrows;

FIG. 4 is a right side elevational section view, with parts in section, of a modified educational aid viewing apparatus, similar to the view in FIG. 2, and showing a modified flash card mounting means and means for adjusting one of the viewing mirrors;

FIG. 9 is a fragmentary, side elevational view of modified embodiment of the invention, wherein the educational aid material is mounted on a roll of tape which is moved between two rolls by a manually operated means;

FIG. 10 is an elevational view of the structure illustrated in FIG. 9, taken along the line 10—10 thereof, and looking in the direction of the arrows;

FIG. 12 is a front elevational view of another embodiment of the invention which is provided with a fixed mirror, a movable mirror, and a writing board such as a blackboard or the like;

FIG. 13 is a top plan view of the structure illustrated in FIG. 12, taken along the line 13—13 thereof, and looking in the direction of the arrows and, FIG. 14 is a fragmentary, side elevational view of the structure illustrated in FIG. 12, taken along the line 14—14 thereof, and looking in the direction of the arrows.

Figure 1:
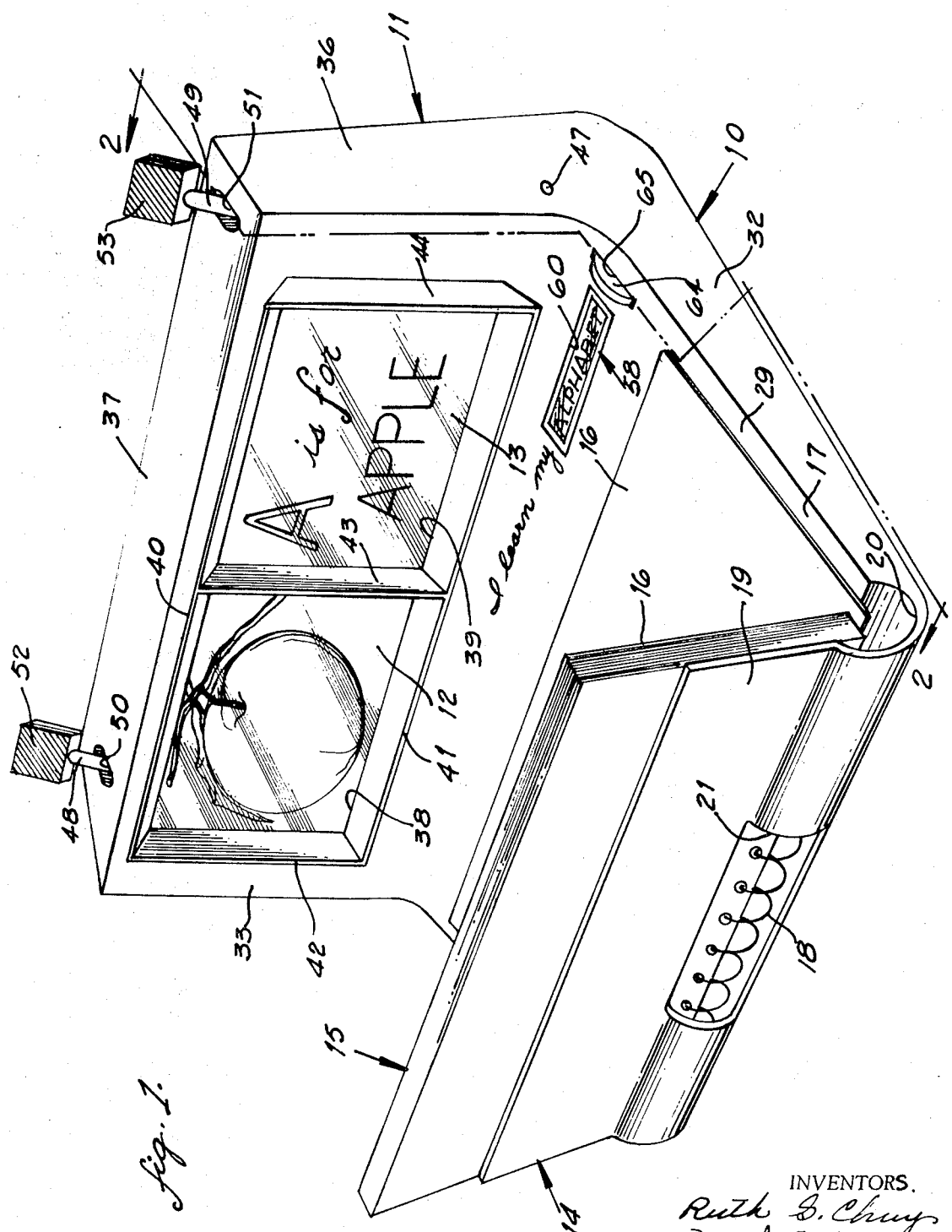

Referring now to the drawings, and in particular to FIG. 1 through 3, the numeral 10 generally designates an elongated platform on which is carried a mirror housing, generally indicated by the numeral 11 at the rear end thereof. The mirror housing 11 contains a pair of pivotally mounted mirrors 12 and 13. A flash card mounting means, generally indicated by the numeral 14 is formed on the front end of the platform 10. The flash card mounting means 14 is adapted to operatively support a set of flash cards, generally indicated by the numeral 15, with each of the individual flash cards being designated by the numeral 16.

The elongated platform 10 may be made from any suitable material, as for example, a plastic material, and it is formed in the shape of an elongated member with a forwardly and downwardly sloping flash card seat or rest area on the upper surface of the front end thereof, as indicated by the numeral 17. The flash cards 16 are adapted to rest on the platform portion 17 in an inoperative position. The flash cards 16 may be held together by any suitable means, as for example, by the spiral wire pivot connector means 18.

As shown in FIGS. 1 and 2, the platform 10 has integrally formed on the front end thereof a forwardly and upwardly inclined flash card rest plate or flange 19 against which the flash cards 16 are disposed for viewing the rear faces thereof in the mirrors 12 and 13. The lower end of the flash card support plate 19 is connected to the front end of the platform 10 by a transverse semicircular recess member 20 in which is seated the spiral connector means 18. As shown in FIG. 1, the front wall of the semicircular recess member 20 is broken away as indicated by the numeral 21, to permit access to the spiral connector means 18.

It will be seen by an inspection of FIG. 2, that the flash cards 16 are disposed at an acute angle relative to the mirrors 12 and 13 when the flash cards 16 are in the vertically inclined operative viewing position against the support flange 19.

Figure 5:
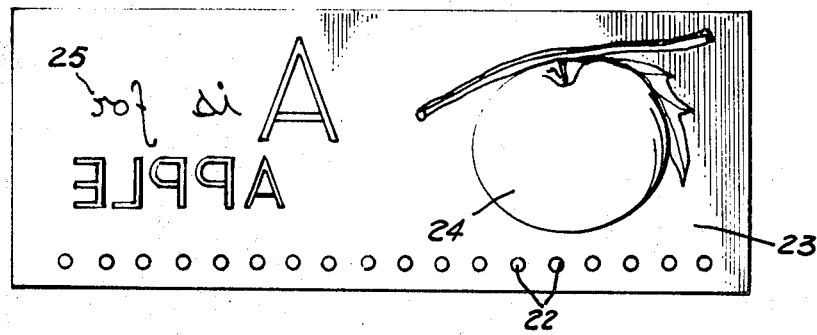
FIGS. 5, 6 and 7 illustrate three different types of flash cards which may be used with the educational aid viewing apparatus of the present invention.
Figure 6:
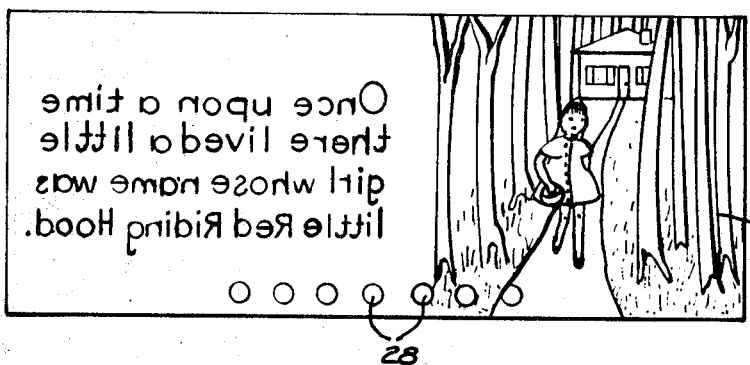
Figure 7:
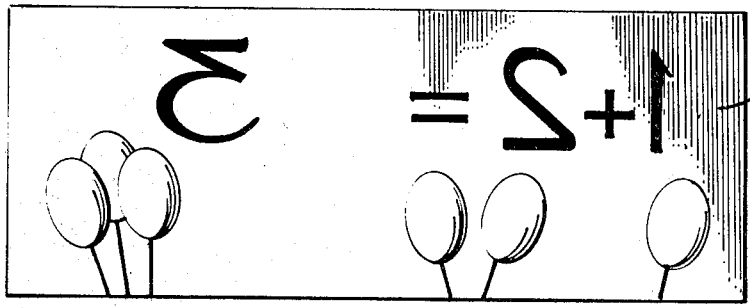

FIGS. 5, 6 and 7 illustrate three different types of flash cards which may be used with the educational aid viewing apparatus of the present invention. The flash card 23 shown in FIG. 5 is provided with a plurality of holes 22 in the lower end thereof for securing this card together with other similar cards to form a set of flash cards. The card 23 shown in FIG. 5 is shown with the rear side facing the viewer, that is the side which would be disposed towards the mirrors 12 and 13. It will be seen that an apple 24 is shown on the one side of the rear face of the flash card 23 and the indicia "A is for apple" on the other side of the rear face of the flash card 23.

The flash card shown in FIG. 6 is indicated by the numeral 26 and it shows a first sequence in the story of "Little Red Riding Hood." "Little Red Riding Hood" is shown on one side of the rear face of card 26 so as to be viewed in the mirror 12, and, on the other side of the rear face of the card 26, the first sentence in the "Little Red Riding Hood" story is shown so as to show in the mirror 13.

The numeral 27 designates the flash card of FIG. 7 and the educational aid subject matter on the card 27 concerns mathematics and specifically shows the addition of the numeral 1 and the numeral 2 to provide the resultant sum 3. The problems showing the numerals 1 and 2 are on one side of the rear face of the flash card 27 so as to be seen in the mirror 12 and the resultant sum 3 is on the other side of the rear face of the flash card 27 so as to show the resultant sum 3 in the mirror 13.

It will be understood that the flash cards of the type shown by the numerals 23, 26 and 27 comprise what is termed herein "carrier means" for carrying educational aid subject matter, and that the various problems, stories, questions and the like are the educational aid subject matter which is carried on said carrier means.

As shown in FIG. 6, the flash card 26 is provided with holes 28 along only the central portion of the lower edge thereof so that the spiral connector means 18 would only be used along the center of the bottom edge of said flash card, as compared to the flash card 23 of FIG. 5 wherein the holes 22 for the spiral connector means 18 run for the entire length of the card 23. The flash card 27 shown in FIG. 7 is not provided with any holes for securing the same into a set as shown in FIG. 2, and the card 27 is adapted to be used in an unbound manner as shown in FIG. 4, and as described hereinafter.

As shown in FIG. 2, the platform 10 is hollow in construction and includes the integral top and bottom walls 29 and 30, and the side walls 31 and 32. As shown in FIG. 2, the platform top wall 29 is integral with the upwardly and rearwardly inclined front wall 33 of the mirror housing 11. The mirror housing 11 is also hollow in construction and includes the rear vertical wall 34 which is integral with the bottom wall 30 of the platform 10. The mirror housing 11 further includes the left side wall 35, the right side wall 36 (FIG. 1), and the top wall 37.

As best seen in FIG. 1, the front wall 33 of the mirror housing 11 is provided with the two adjacently disposed mirror openings 38 and 39 which are enclosed by the top and bottom horizontal frame members 40 and 41 and the vertical frame members 42, 43 and 44. As shown in FIG. 2, the mirrors 12 and 13 are mounted on suitable frames 45 and 46 for pivoting the mirrors 12 and 13 between an inclined operative position against the inner face of the front wall 33 and a retracted inoperative inclined position spaced rearwardly from the front wall 33. As shown in FIG. 2, the mirror 12 is disposed in a retracted inoperative position and the mirror 13 is disposed in an inclined operative position. The lower ends of the mirror frames 45 and 46 are pivotally mounted on a transverse shaft 47 which has the ends thereof supported by the mirror housing side walls 35 and 36.

As shown in FIGS. 1 and 2, the mirrors 12 and 13 are rotated between the operative and inoperative positions by a suitable means which comprises the rods 48 and 49, respectively. As shown in FIG. 1, the rods 48 and 49 extend upwardly through the slots 50 and 51, respectively, which are formed through the mirror housing top end wall 37. The upper ends of the operating rods 48 and 49 are provided with knobs 52 and 53, respectively. The lower ends of the operating rods 48 and 49 are bent sidewardly, inwardly, as indicated by the numerals 54 and 55, respectively, in FIG. 2. The sidewardly bent rod ends 54 and 55 are rotatably mounted in the holes 56 and 57, respectively, formed in the outer sides of the mirror frames 45 and 46. As shown in FIG. 2, the lower portions of the rods 48 and 49 are bent forwardly.

It will be seen that when the rods 48 and 49 are moved rearwardly in the slots 50 and 51, respectively, that they will engage the rear end of slots 50 and 51 and that continued rearward pressure upon the rods will pivot the rods about the rear ends of the slots and the lower end of the rods will cam the mirrors 12 and 13 to the operative position against the inside of the mirror housing front wall 33. When the rods 48 and 49 are moved forwardl they will engage the front end of the slots 50 and 51, and continued movement will cam the mirrors 12 and 13 backwardly to the retracted or inoperative position, as shown in FIG. 2 by mirror 12. It will be seen that the inclined operative position of the mirrors is assumed when they are disposed at an acute angle relative to the position of the flash cards 16, when the cards 16 are disposed in the vertically inclined position on the flash card holding support means, or mounting means 19.

FIG. 1 shows both of the mirrors 12 and 13 moved to the forward operative position so as to permit an observer to view the educational aid subject matter on the card 16 facing the mirrors. In the illustrated embodiment of FIG. 1, the card 23 of FIG. 5 is shown as being the card observable in the mirrors of FIG. 1.

As shown in FIGS. 1, 2 and 3, the educational aid viewing apparatus of the present invention is provided with an indicator means 58 for indicating the type of educational aid subject matter carried on the carrier means on the front end of the platform 10. The indicator means 58 comprises an elongated, horizontal rotor 59 which in the illustrated embodiment is provided with six flat sides. Each of said flat sides is marked with indicia such as the "alphabet," "mathematics," and the like, to indicate the type of educational aid subject matter being used with the apparatus. The appropriate flat side of the rotor 59 is turned upwardly so that it can be viewed through the elongated opening 60 formed in the platform top wall 29. The rotor 59 is provided with a pair of integral supporting shafts 61 and 62 which are rotatably mounted in the inner vertical wall 63 and the outer platform wall 32, respectively. A manual operator in the form of a knurled wheel 64 is fixed on the shaft 62 and it extends upwardly through the slot 65 formed in the platform upper wall 29. It will be seen that by turning the wheel 64, the appropriate educational aid subject matter name will appear in the slot 60 opposite the words "I learn my," which words are formed on the upper face of the platform top wall 29 adjacent the slot 60.

FIG. 4 illustrates a modified embodiment of the invention in which the flash cards are not secured together and at least one of the viewing mirrors is power operated between its operative position and inoperative position. The parts of the embodiment of FIG. 4 which are the same as the embodiment of FIGS. 1 through 3 have been marked with the same reference numerals followed by the small letter "a."

As shown in FIG. 4, the set of flash cards 15a is not provided with any means for hinging the lower end of the cards 16a together as a unit or set. The individual cards 16a are stacked on the upper surface 17a of the top wall 29a, and the lower edges of the cards 16a rest against the vertical shoulder 66 formed on the mounting means 14a. The flash cards 16a are disposed in an operative position against the mounting means flange 19a for viewing in the mirror 13a in the operative position against the flange 19a. The lower ends of the flash cards 16a are adapted to be seated in the operative position on the surface 67 which is formed at right angles to the abutment surface 66. The cards 16a are retained against sideward movement in the operative position by a pair of ends walls as 68.

The embodiment of FIG. 4 illustrates the provision of a power means for moving at least one of the mirrors 12 or 13 between the operative and inoperative positions. The numeral 69 generally indicates an electric motor which is carried on the mounting plate 70 that is secured to the base plate 71 by the screws 72. The base plate 71 is integrally formed on the mirror housing rear wall 34a. The electric motor 69 is provided with an output shaft 73 on which is fixed a drive gear or sprocket 74. The sprocket 74 drives the chain 75 which in turn drives a sprocket 76 mounted on the shaft 47a of the mirror 13a. The electric motor 69 may be provided with power from any suitable electric power source. For example, in the embodiment of FIG. 4 the numeral 78 generally indicates a battery which is connected by suitable lead wires 77 to the motor 69. The flow of power from the battery 78 to the electric motor 69 is controlled by the manually operable switch buttons 79. The switch buttons 79 are operatively connected to the battery 78 by suitable lead wires 80.

It will be understood that both of the viewing mirrors 12 and 13 may be provided with an individual power means of the type illustrated in FIG. 4 for moving these mirrors between their operative and inoperative positions. As shown in FIG. 4, one of the switch buttons 79 would be operated to actuate the motor 69 to move the mirror 13a to one position, as, for example, the operative position shown in FIG. 4; and the other switch button 79 would be operated to actuate the motor 69 to move the mirror 13a to the inoperative position.

Figure 8:
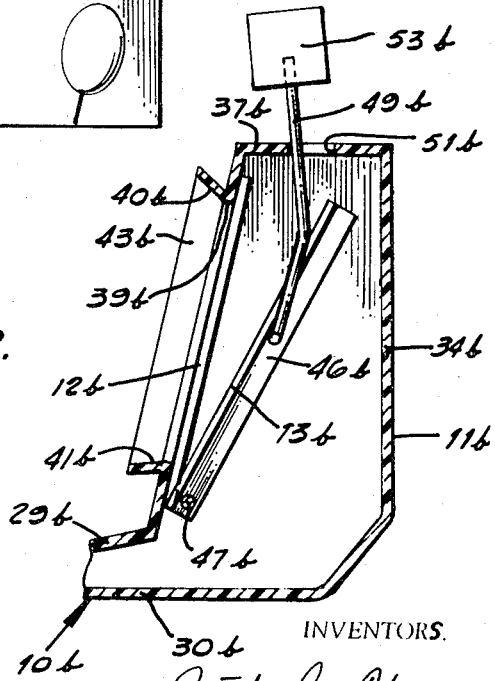
FIG. 8 is a fragmentary, elevational section view of a modified educational aid viewing apparatus, and showing one of the mirrors being permanently mounted and the other mirror being movably mounted.

FIG. 8 illustrates another modification of the invention. In the modification of FIG. 8, the parts of the mirror housing illustrated therein are marked with the same reference numerals as used in the first embodiment of FIGS. 1 through 3, followed by the small letter "b." FIG. 8 illustrates a modified mirror housing 11b wherein the mirror 12b is fixedly mounted in its operative position and it is not movable to an inoperative position as the mirror 12 in the embodiment of FIGS. 1 through 3. The answer mirror 13b is movable between operative and inoperative positions in the same manner as in the embodiment of FIGS. 1 through 3.

FIGS. 9 and 10 illustrative still another modification of the invention wherein the educational aid subject matter carrier means comprises a roller of the type generally indicated by the numeral 88. In this embodiment the educational aid subject matter of the type shown on the flash cards of FIGS. 5, 6 and 7 is shown on the rear face of a continuous roll of tape.

FIGS. 9 and 10 illustrate a modified mounting means for the tape-type carrier means. The parts of the embodiment of FIGS. 9 and 10 which are the same as the embodiment of FIGS. 1 through 3 have been marked with the same reference numerals followed by the small letter "c." The numeral 81 indicates the front end wall of the platform 30c. Mounted on the front end of the platform 30c is the modified mounting means 14c which includes the integral vertical front wall 82, the top wall 83, the side walls 84 and 85, and the rear wall 86. The mounting means rear wall 86 is provided with an opening 87, as shown in FIG. 10, to permit the educational aid subject matter on the lower side of the tape to be viewed in mirrors 12 and 13.

The tape 88 is adapted to be moved through an inclined position as shown in FIG. 9, past the opening 87, from an upper roller 89 to a lower roller 90. The upper roller 89 is provided with a pair of end shafts 91 which are adapted to mount the roller 89 in an L-shaped slot 92 formed in each of the side walls 84 and 85. The roller 89 is freely rotatable to permit the tape 88 to be pulled downwardly and wound on the lower tape roller 90. The roller 90 is a takeup roller or reel and is disposed at a position rearwardly of the roller 89 to provide the inclined viewing position for the tape 88. The roller 90 is provided with a pair of shafts 93 for rotatably supporting the roller 90 between the side walls 84 and 85. As shown in FIGS. 9 and 10, one of the shafts 93 is provided with a manually operable hand crank 94 for rotating the roller 90 to move the tape 88 past the opening 87. Although the tape 88 is shown as being movable through a substantially vertical course of travel, it will be understood that the rollers 89 and 90 could be disposed on a vertical axis so that the tape 88 would move past the opening 87 in a side-to-side manner. When the tape 88 is moved in the last-mentioned manner, the educational aid subject matter would be arranged accordingly so that it would still appear in the same viewing position as indicated in FIG. 10.

Figure 11:
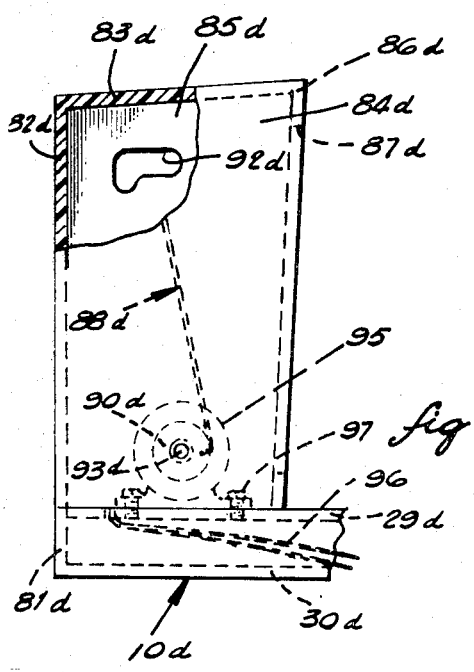
FIG. 11 is a fragmentary, side elevational view, with parts broken away, of an educational aid viewing apparatus provided with a tape for carrying the educational aid material, and which tape is mounted on rolls that are power operated for moving the tape between the rolls.

FIG. 11 illustrates a modified tape carrier means. The parts of the tape carrier of FIG. 11 which are the same as the tape carrier parts of FIG. 10 have been marked with the same reference numerals followed by the small letter "d." In the embodiment of FIG. 11 the lower roller 90d is provided with a power means for rotating the same, in the form of an electric motor 95. The electric motor 95 would be connected to any suitable source of electric power by means of the lead wires 96. The electric source of power could be any suitable battery means or the usual 110-volt residential power source. The motor 95 is adapted to be secured to the upper wall 29d of the platform 30d by any suitable means, as by the screws 97.

FIGS. 12, 13 and 14 illustrate still another modification of the invention wherein the educational aid viewing apparatus is provided with an integrally formed writing platform 98. The platform 98 may be of any suitable type, as, for example, merely a flat surface on which writing paper may be clipped. The platform 98 may be provided with an upper surface which may receive writing directly as, for example, a blackboard type surface. The embodiment of FIGS. 12, 13 and 14 includes the mounting means structure of FIG. 4 and the mirror housing structure of FIG. 8. That is, only one of the mirrors 13e is movable. The question mirror 12e is fixed in position. The parts of the embodiment of FIGS. 12, 13 and 14 which are the same as the embodiments of FIGS. 4 and 8 have been marked with the same reference numerals followed by the small letter "e."

The configuration of the housing of the viewing apparatus provides the apparatus with the appearance of a computer. It will be understood, however, that the two mirrors 12 and 13 could be aligned vertically instead of horizontally and the flash cards and tape would then have the educational aid subject matter arranged vertically instead of horizontally. It will also be understood that the mounting means could hold the carrier means in a vertical position but that in such case the rear face of the carrier means would still be disposed at an acute angle relative to mirrors 12 and 13.

While it will be apparent that the preferred embodiments of the invention herein disclosed are well calculated to fulfill the objects above stated, it will be appreciated that the invention is susceptible to modification, variation and change.

What is claimed is:

1. A device of the class described, comprising:
   (a) a platform;
   (b) a housing on the rear end of said platform;
   (c) a pair of mirrors mounted in said housing in an operative inclined position so that the mirrors slope upwardly and rearwardly relative to the front end of the platform;
   (d) carrier means provided with a rear face carrying educational aid subject matter comprising problems, questions, words and the like, and solutions, answers and pictures corresponding to said problems, questions, words and the like, respectively, with said problems, questions, words and the like being viewable in one of the mirrors and the solutions, answers and pictures being viewable in the other mirror;
   (e) mounting means on the front end of the platform for holding said carrier means carrying said educational aid subject matter in a position unobservable in said mirrors and for holding said carrier means in an inclined observable position spaced forwardly from said mirrors, so that when the carrier means carrying said educational aid subject matter is in said inclined observable position the rear face of said carrier means is viewable in said mirrors; and,
   (f) at least one of said mirrors being pivotally mounted in said housing and being movable between said inclined operative position and a retracted inoperative position.

2. A device of the class described in claim 1, wherein:
   (a) each of said pair of mirrors is pivotally mounted in said housing and is movable between said inclined operative position and a retracted inoperative position.

3. A device of the class described in claim 1, wherein:
   (a) one of said pair of mirrors is pivotally mounted in said housing and is movable between said inclined operative position and a retracted inoperative position; and,
   (b) the other of said pair of mirrors is fixed in said housing in said inclined position.

4. A device of the class described in claim 1, including:
   (a) means for moving at least one of said mirrors between said operative and inoperative positions.

5. A device of the class described in claim 4, wherein:
   (a) said means for moving said pivotally mounted mirror between said operative and inoperative positions includes:
      (1) means for journalling said mirror on said housing for rotatable movement between said positions; and,
      (2) a control rod having one end connected to said mirror and the other end extended outwardly of said housing for manual movement of the rod to move the mirror between said positions.

6. A device of the class described in claim 4, wherein:
   (a) said means for moving said pivotally mounted mirror between said operative and inoperative positions includes a power operated means.

7. A device of the class described in claim 1, including:
   (a) indicator means rotatably mounted on said platform for indicating the type of educational aid subject matter carried on the carrier means mounted on the front end of the platform.

8. A device of the class described in claim 1, wherein:
   (a) said mounting means for holding said carrier means in a position so that the educational aid subject matter is unobservable in said mirrors includes means for pivotally mounting the carrier means in a position on the platform in front of the mirrors so that the carrier means may be rotated into position in front of said mirrors to said observable position.

9. A device of the class described in claim 8, wherein:
   (a) said carrier means comprises a set of flash cards carrying said educational aid subject matter on the rear faces thereof, and wherein said flash cards are hingedly connected together at the bottom ends thereof.

10. A device of the class described in claim 8, wherein:
    (a) said carrier means comprises a set of flash cards carrying said educational aid subject matter on the rear faces thereof, and wherein said flash cards are not attached together and may be moved separately from the unobservable position on the platform in front of the mirrors to said observable position.

11. A device of the class described in claim 1, wherein:
    (a) said carrier means comprises a roll of tape which is adapted to be moved from a first roll to a second roll, and wherein said educational aid subject matter is on the rear side of the tape which faces said mirrors.

12. A device of the class described in claim 11, wherein:
    (a) said roll of tape carrying said educational aid subject matter is movable from one of said rolls to the other of said rolls to said observable position by a manually operated means.

13. A device of the class described in claim 11, wherein:
    (a) said roll of tape is adapted to be moved from one of said rolls to the other of said rolls by a power operated means.

14. A device of the class described in claim 1, including:
    (a) a writing board on one side of said platform.

15. A device of the class described in claim 1, wherein:
    (a) said mounting means for holding the educational aid subject matter means in an observable position is adapted to hold said carrier means at a forwardly and upwardly inclined angle so that the rear face thereof carrying the educational aid subject matter is viewable in said mirrors and is disposed at an acute angle relative to said mirrors.

16. A device of the class described, comprising:
(a) a platform;
(b) a housing on the rear end of said platform having a simulated computer appearance;
(c) a pair of mirrors mounted in said housing in an operative position on the front end of the platform with at least one of said mirrors being pivotally mounted;
(d) carrier means provided with a rear face carrying educational aid subject matter comprising problems, questions, words and the like, and solutions, answers and pictures corresponding to said problems, questions, words and the like, respectively, with said problems, questions, words and the like being viewable in one of the mirrors and the solutions, answers and pictures being viewable in the other mirror; and,
(e) mounting means on the front end of the platform for holding said carrier means carrying said educational aid subject matter in a position unobservable in said mirrors and for holding said carrier means in an observable position spaced forwardly from said mirrors, so that when the carrier means carrying said educational aid subject matter is in said observable position the rear face of said carrier means is viewable in said mirrors.

References Cited
UNITED STATES PATENTS

| | | | |
|---|---|---|---|
| 778,092 | 12/1904 | Willson | 35—76 |
| 1,736,552 | 11/1929 | Shulman et al. | 35—9 |
| 3,271,882 | 9/1966 | Chuy | 35—9X |
| 3,339,296 | 9/1967 | Chuy | 35—9X |
| 3,387,390 | 6/1968 | Chuy et al. | 35—9X |
| 3,417,490 | 12/1968 | Chuy et al. | 35—9X |

WILLIAM H. GRIEB, Primary Examiner